(12) United States Patent
Inoue et al.

(10) Patent No.: US 10,427,308 B2
(45) Date of Patent: Oct. 1, 2019

(54) WIRE BODY PROCESSING STRUCTURE FOR ROBOT

(71) Applicant: FANUC CORPORATION, Yamanashi (JP)

(72) Inventors: Toshihiko Inoue, Yamanashi (JP); Tomoyuki Motokado, Yamanashi (JP); Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 302 days.

(21) Appl. No.: 15/476,318

(22) Filed: Mar. 31, 2017

(65) Prior Publication Data

US 2017/0291305 A1    Oct. 12, 2017

(30) Foreign Application Priority Data

Apr. 7, 2016   (JP) .................................. 2016-077495

(51) Int. Cl.
*B23K 9/10* (2006.01)
*B23K 9/00* (2006.01)
(Continued)

(52) U.S. Cl.
CPC ........... *B25J 15/0019* (2013.01); *B23K 9/323* (2013.01); *B25J 19/0029* (2013.01); *Y10S 901/42* (2013.01)

(58) Field of Classification Search
CPC ........... G06F 13/00; G06F 13/14; G06F 3/14; H04M 9/06; B25J 15/0019; B25J 19/0029;
(Continued)

(56) References Cited

U.S. PATENT DOCUMENTS 4,554,432 A * 11/1985 Raloff ................... B23K 9/295
                                                               219/137.43
8,051,741 B2 * 11/2011 Inoue ................... B25J 19/0025
                                                               74/490.01
(Continued)

FOREIGN PATENT DOCUMENTS

CN              1714981 A      1/2006
CN           101327586 A     12/2008
(Continued)

OTHER PUBLICATIONS

Japanese Decision to Grant a Patent dated Oct. 30, 2018, in connection with corresponding JP Application No. 2016-077495 (6 pgs., including machine-generated English translation).
(Continued)

*Primary Examiner* — Sang Y Paik
(74) *Attorney, Agent, or Firm* — Maier & Maier, PLLC

(57) ABSTRACT

Provided is a wire body processing structure for a robot having a wrist, a base end of which is connected to a forearm in a rotatable manner about a first axis and a distal end of which has a plurality of working tools attached thereto. The wire body processing structure includes a first flexible conduit disposed along the first axis from the forearm to the distal end of the wrist and also includes a second flexible conduit disposed longitudinally within the first conduit. A first wire body for one of the working tools is extended longitudinally through the second conduit. A second wire body for another one of the working tools is extended longitudinally through a space between the first conduit and the second conduit.

6 Claims, 4 Drawing Sheets

(51) Int. Cl.
*B25J 15/00* (2006.01)
*B25J 19/00* (2006.01)
*B23K 9/32* (2006.01)

(58) Field of Classification Search
CPC ....... B23K 9/133; B23K 9/323; Y10S 901/41; Y10S 901/42
USPC ......... 219/136–137.63, 158, 159; 901/41, 42
See application file for complete search history.

(56) References Cited

U.S. PATENT DOCUMENTS

| | | |
|---|---|---|
| 2004/0144764 A1 | 7/2004 | Inoue et al. |
| 2004/0179900 A1 | 9/2004 | Uematsu et al. |
| 2005/0096792 A1 | 5/2005 | Watanabe et al. |
| 2005/0189333 A1 | 9/2005 | Nakagiri et al. |
| 2005/0211686 A1 | 9/2005 | Inoue et al. |
| 2006/0000817 A1* | 1/2006 | Inoue ................. B23K 9/1336 219/125.1 |
| 2008/0236324 A1 | 10/2008 | Inoue et al. |
| 2008/0315820 A1 | 12/2008 | Inoue et al. |
| 2009/0032649 A1 | 2/2009 | Inoue et al. |
| 2012/0325781 A1 | 12/2012 | Gneiting et al. |
| 2014/0332504 A1* | 11/2014 | Hamada ................. B23K 31/00 219/121.4 |
| 2015/0076131 A1 | 3/2015 | Terada et al. |
| 2015/0076213 A1 | 3/2015 | Terada et al. |

FOREIGN PATENT DOCUMENTS

| | | |
|---|---|---|
| CN | 104439627 A | 3/2015 |
| CN | 104889974 A | 9/2015 |
| EP | 1 453 170 A2 | 1/2004 |
| EP | 1440760 A1 | 7/2004 |
| EP | 1527852 A1 | 5/2005 |
| EP | 1974874 A1 | 10/2008 |
| EP | 2006056 A1 | 12/2008 |
| EP | 2851163 A1 | 3/2015 |
| EP | 2851164 A1 | 3/2015 |
| JP | H02-292189 A | 12/1990 |
| JP | 2001-260068 A | 9/2001 |
| JP | 2004-223576 A | 8/2004 |
| JP | 2004-276233 A | 10/2004 |
| JP | 2005131761 A | 5/2005 |
| JP | 4286684 B | 9/2005 |
| JP | 4301984 B | 10/2005 |
| JP | 2008-238320 A | 10/2008 |
| JP | 2009-028875 A | 2/2009 |
| JP | 4261598 B | 2/2009 |
| JP | 2013-006213 A | 1/2013 |

OTHER PUBLICATIONS

Japanese Search Report dated Mar. 7, 2018, in connection with corresponding JP Application No. 2016-077495 (59 pgs., including machine-generated English translation).

Office Action dated Jan. 30, 2019 in corresponding Chinese Application No. 201710081471.3; 9 pages.

* cited by examiner

WIRE BODY PROCESSING STRUCTURE FOR ROBOT

CROSS-REFERENCE TO RELATED APPLICATIONS

This application is based on Japanese Patent Application No. 2016-077495, the contents of which are incorporated herein by reference.

TECHNICAL FIELD

The present invention relates to wire body processing structures for robot.

BACKGROUND ART

In a known wire body processing structure in the related art, a wire body for controlling a working tool attached to the distal end of a forearm extends through the forearm so as to be routed therefrom (for example, see Patent Literature 1). Normally, in this wire body processing structure, if there are a plurality of working tools attached to the distal end of the forearm, a wire body for controlling one of the working tools extends through the forearm, whereas a wire body for controlling the remaining working tools extends outside the forearm.

CITATION LIST

Patent Literature

{PTL 1}
The Publication of Japanese Patent No. 4286684

SUMMARY OF INVENTION

Technical Problem

An object of the present invention is to provide a wire body processing structure for a robot with which wire body for controlling a plurality of working tools can be routed such that they do not interfere with peripheral devices even when the working tools are attached to the distal end of a forearm.

An aspect of the present invention provides a wire body processing structure for a robot having a wrist a base end of which is connected to a forearm in a rotatable manner about a first axis and a distal end of which has a plurality of working tools attached thereto. The wire body processing structure includes a first conduit having flexibility and disposed along the first axis from the forearm to the distal end of the wrist and a second conduit having flexibility and disposed longitudinally within the first conduit. A first wire body for one of the working tools is disposed so as to extend longitudinally through the second conduit. A second wire body for another one of the working tools is disposed so as to extend longitudinally through a space between the first conduit and the second conduit. The first conduit and the second conduit may be tubular members composed of resin or may be tubular members formed of a fabric, such as aramid fiber. Since the second conduit is disposed inside the first conduit, the second conduit may be a tubular member formed of a fabric.

In the above aspect, the wire body processing structure may further include an attachment flange member configured to attach the plurality of working tools to the distal end of the wrist. The attachment flange member may be provided with a through-hole through which the second conduit extends and a window that exposes the space between the first conduit and the second conduit toward a radially outer side and through which the second wire body extends.

In the above aspect, a distal end and a base end of the first conduit may be engaged with holes provided in the forearm and the wrist, and at least one of the distal end and the base end may be disposed in a movable manner along the first axis. For example, there may also be a case where the distal end of the wrist is fixed to the second wrist element at the distal end and the working-tool control device is disposed at the base end in a movable manner along the first axis.

In the above aspect, a distal end of the first conduit may be engaged with a hole formed in the wrist in a movable manner along the first axis, and the wire body processing structure may further include a movement limiting unit that limits movement of the first conduit along the first axis so as to prevent the first conduit from protruding toward the attachment flange member beyond a distal-end surface of the wrist.

In the above aspect, a distal end and a base end of the second conduit may be engaged with holes provided in a member fixed to the forearm and the attachment flange member or in the working tools, and at least one of the distal end and the base end may be disposed in a movable manner along the first axis. For example, there may also be a case where the working-tool control device is fixed to the second wire body at the base end and the distal end of the wrist is disposed at the distal end in a movable manner along the first axis.

In the above aspect, the distal end of the second conduit may be engaged with the hole provided in one of the working tools in a movable manner along the first axis, and the working tool may limit movement of the second conduit toward the distal end along the first axis.

In the above aspect, the base end of the first conduit and the base end of the second conduit may be disposed in a movable manner along the first axis, the member fixed to the forearm may be a working-tool control device that is configured to control the working tools, and the working-tool control device may be configured to limit movement of the first conduit and the second conduit toward the base end along the first axis.

DESCRIPTION OF EMBODIMENTS

A wire body processing structure 1 of a robot 2 according to an embodiment of the present invention will be described below with reference to the drawings.

Figure 1:
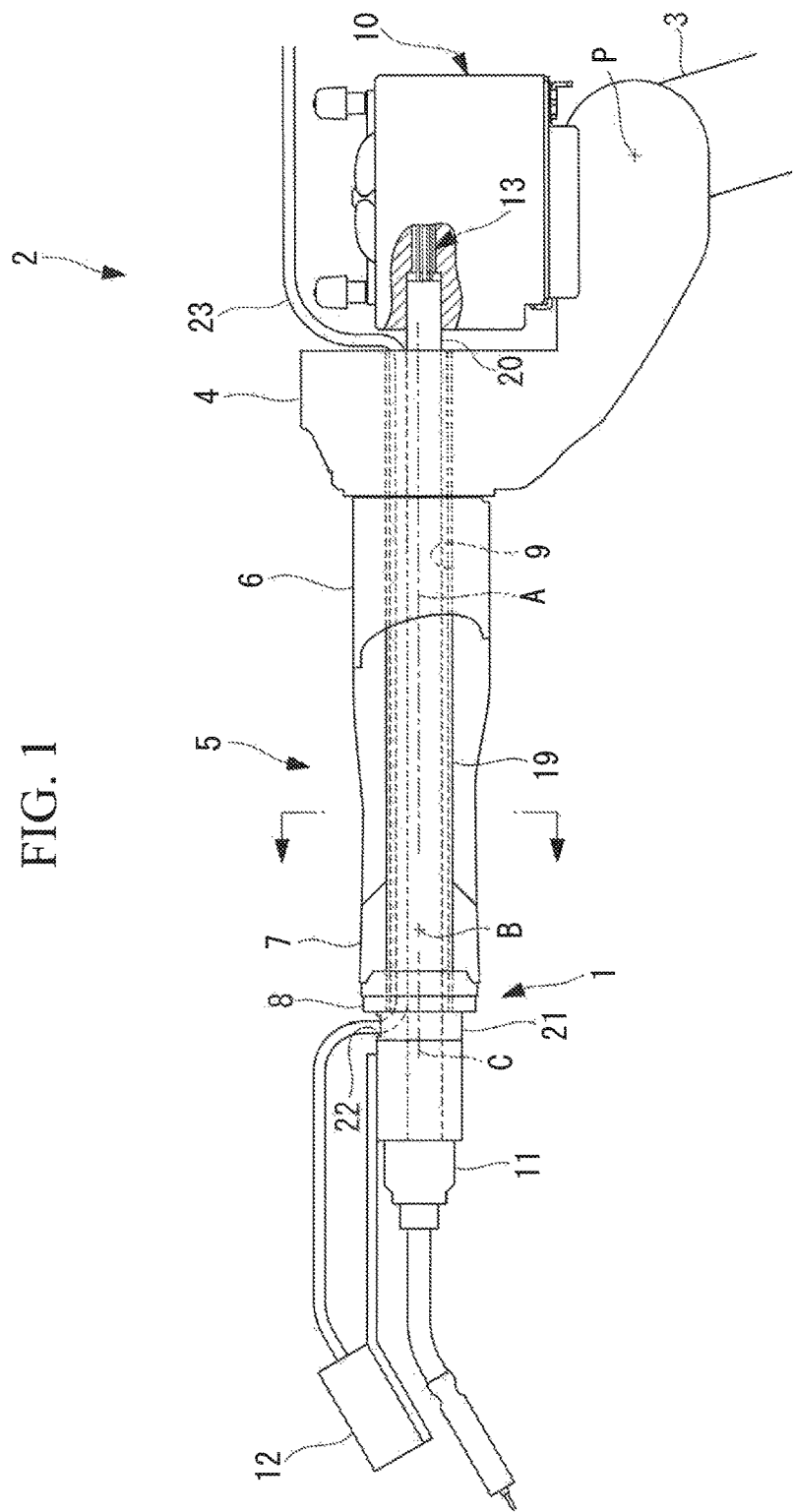
FIG. 1 illustrates a wire body processing structure for a robot according to an embodiment of the present invention and is a side view of a forearm and a wrist thereof.

As shown in FIG. 1, the robot 2 to which the wire body processing structure 1 according to this embodiment is applied includes a forearm 4 supported by the distal end of an upper arm 3 in a swivelable manner about a horizontal axis P and a wrist 5 supported by the forearm 4 in a rotatable manner about a first axis A.

The wrist 5 includes a first wrist element 6 that is rotated about the first axis A, a second wrist element 7 that is rotated about a second axis B orthogonal to the first axis A, and a third wrist element 8 that is rotated about a third axis C orthogonal to the second axis B. FIG. 1 illustrates a state where the first axis A and the third axis C are disposed in a straight line.

The forearm 4, the first wrist element 6, the second wrist element 7, and the third wrist element 8 are provided with a through-path 9 extending therethrough near the first axis A and along the first axis A from the rear of the forearm 4 to the front of the third wrist element 8. A working-tool control device that controls working tools is secured to a rear section of the forearm 4.

In this embodiment, two working tools, namely, a welding torch 11 and a sensor 12 that detects the welding state by the welding torch 11 are attached to the distal end of the wrist 5. In this embodiment, the welding-tool control device is a wire feed device 10 that controls the feeding of a wire to the welding torch 11, and a wire body (first wire body) 13 guided from the wire feed device 10 to the welding torch 11 includes a gas hose 14 that supplies assist gas, a wire conduit 16 that feeds a welding wire, and a power feeding cable 17 that feeds electricity to the welding torch 11. A wire body (second wire body) 23 guided to the sensor 12 includes a cable 18 for feeding electricity to the sensor 12 and for transmission of a detection signal and also includes a pipe 24 that supplies air for purging the sensor 12.

As shown in FIG. 1, the wire body processing structure 1 for the robot 2 according to this embodiment includes a first conduit 19 having flexibility and accommodated within the through-path 9 extending from the rear of the forearm 4 to the front of the third wrist element 8, a second conduit 20 having flexibility and extending longitudinally through the first conduit 19, and an attachment flange member 21 that is fixed to the distal end surface of the third wrist element 8 and that secures the welding torch 11 and the sensor 12 to the third wrist element 8.

For example, the first conduit 19 and the second conduit 20 are tubular members composed of resin, have corrugated cross sections, and are easily bendable. The first conduit 19 and the second conduit 20 may each be a tubular member formed of an easily bendable fabric, such as aramid fiber.

Figure 2:
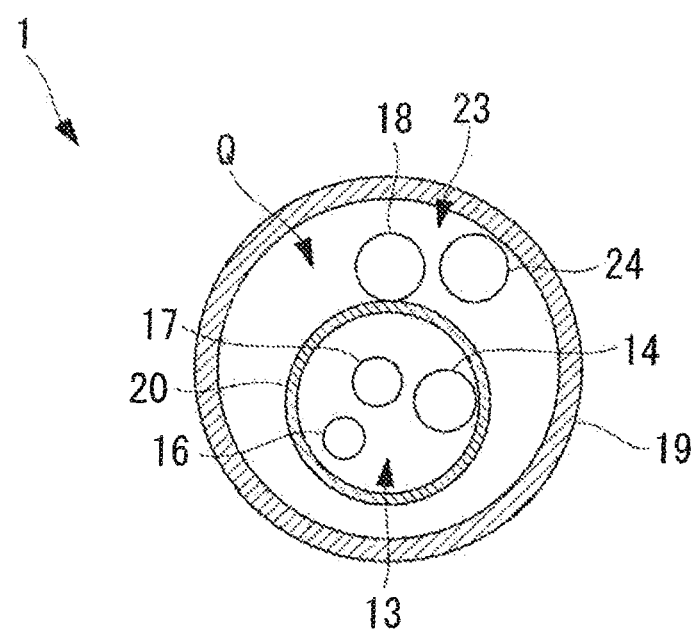
FIG. 2 is a cross-sectional view illustrating routing of wire body in the wire body processing structure in FIG. 1.

As shown in FIG. 2, the outer diameter of the second conduit 20 is sufficiently smaller than the inner diameter of the first conduit 19, such that a cylindrical space Q is formed between the two conduits 19 and 20.

As shown in FIGS. 1 and 2, in the wire body processing structure 1 according to this embodiment, the first wire body 13 for the welding torch 11 is routed in the longitudinal direction through the second conduit 20, which is at the inner side, and the second wire body 23 for the sensor 12 is routed in the longitudinal direction through the cylindrical space Q between the first conduit 19 and the second conduit 20.

The distal end of the first conduit 19 is engaged with a circular-cross-section through-hole that forms the through-path 9 in the second wrist element 7 and the third wrist element 8. Moreover, the base end of the first conduit 19 is engaged with a circular-cross-section through-hole that forms the through-path 9 in the forearm 4. Thus, both ends of the first conduit 19 are engaged with the through-holes that form the through-path 9, so that the first conduit 19 is supported by the third wrist element 8 and the forearm 4. The opposite ends of the first conduit 19 are engaged with the through-holes in a movable manner along the longitudinal axis.

The attachment flange member 21 is a substantially disk-shaped member having a through-hole through which the second conduit 20 extends and having an outer diameter that is larger than the outer diameter of the first conduit 19. The through-hole in the attachment flange member 21 is set to be larger than the outer diameter of the second conduit 20 and smaller than the outer diameter of the first conduit 19.

The attachment flange member 21 is provided with a window 22 that communicates with the cylindrical space Q between the first conduit 19 engaged with the through-hole and the second conduit 20 disposed inside the first conduit 19 and that exposes the cylindrical space Q from the outer peripheral surface when the attachment flange member 21 is attached to the distal end surface of the third wrist element 8. The window 22 has a bore diameter with which the second wire body 23 for the sensor 12 can extend therethrough.

Thus, when the attachment flange member 21 is attached to the distal end surface of the third wrist element 8, the second conduit 20 extends through the through-hole toward the welding torch 11, and the through-hole in the third wrist element 8 engaged with the first conduit 19 is closed, so that the movement of the first conduit 19 along the first axis A is limited to prevent it from moving toward the distal end beyond the distal end surface of the third wrist element 8. Specifically, the attachment flange member 21 serves as a movement limiting unit. Furthermore, because the wire feed device 10 is disposed at a position near the rear of the through-hole in the forearm 4, the movement of the first conduit 19 toward the base end is limited by the wire feed device 10.

The second wire body 23 for the sensor 12 extending through the cylindrical space Q between the first conduit 19 and the second conduit 20 is routed radially outward of the attachment flange member 21 via the window 22 of the attachment flange member 21 and is routed, by the attachment flange member 21, to the sensor 12 fixed to the distal end surface of the third wrist element 8.

The distal end of the second conduit 20 is engaged with a circular-cross-section through-hole provided in the attachment flange member 21 and a bracket of the welding torch 11. Furthermore, the base end of the second conduit 20 is engaged with a circular-cross-section through-hole provided in the wire feed device 10 secured to the rear section of the forearm 4. Thus, both ends of the second conduit 20 are engaged with the through-holes, so that the second conduit 20 is supported by the welding torch 11 and the wire feed device 10. Moreover, the opposite ends of the second conduit 20 are engaged with the through-holes in a movable manner along the longitudinal axis.

The distal end of the second conduit 20 abuts on the welding torch 11 so that the movement thereof toward the distal end is limited, and likewise, the base end of the second conduit 20 abuts on a step within the through-hole in the wire feed device 10 so that the movement thereof toward the base end is limited.

The wire body processing structure 1 for the robot 2 according to this embodiment having the above-described configuration will be described below.

In the wire body processing structure 1 for the robot 2 according to this embodiment, the first conduit 19 and the second conduit 20, which have flexibility, form a double-tube structure and are disposed along the first axis A. Moreover, the first wire body 13 for the welding torch 11 is routed through the second conduit 20 at the inner side, and the second wire body 23 for the sensor 12 is routed through the cylindrical space between the two conduits 19 and 20.

Accordingly, the wire body 13 and 23 for the plurality of working tools can be simultaneously disposed near the first axis A, which is the rotational axis of the wrist 5 relative to the forearm 4, and the paths of the wire body 13 and 23 do not have to be significantly shifted even when the wrist 5 is rotated about the first axis A relative to the forearm 4, which is advantageous in that interference between peripheral devices and the wire body 13 and 23 can be reduced.

In this case, if the first wrist element 6 is rotated about the first axis A relative to the forearm 4, if the second wrist element 7 is swiveled about the second axis B, or if the third wrist element 8 is rotated about the third axis C, the path lengths of the first conduit 19 and the second conduit 20 would change. However, because the first conduit 19 and the second conduit 20 have their opposite ends supported in a movable manner in the longitudinal direction, the changes in the path lengths can be compensated for by moving the opposite ends in the longitudinal direction.

Since the first conduit 19 is interposed between the attachment flange member 21 and the wire feed device 10 in the longitudinal direction and the movement thereof in the longitudinal direction is thus limited to a predetermined amount or smaller, the first conduit 19 is prevented from moving significantly relative to the through-hole, whereby the first conduit 19 can be prevented from being disengaged from the through-hole.

Likewise, since the second conduit 20 is interposed between the welding torch 11 and the step within the through-hole in the wire feed device 10 in the longitudinal direction, the movement thereof in the longitudinal direction is limited to a predetermined amount or smaller, so that the second conduit 20 is prevented from moving significantly relative to the through-hole, whereby the second conduit 20 can be prevented from being disengaged from the through-hole.

Specifically, both the first conduit 19 and the second conduit 20 are supported such that they are prevented from coming out of the through-holes by a simple structure of simply engaging their opposite ends with the through-holes. This is advantageous in that the wire body 13 and 23 can be protected from excessive external force even when the wrist elements 6, 7, and 8 move.

In this embodiment, the first conduit 19 and the second conduit 20 are both supported by the through-holes in a movable manner at their opposite ends. Alternatively, one of the distal end and the base end may be supported in a movable manner, whereas the other end may be fixed in a non-movable manner by a fixing member 25.

Figure 3:
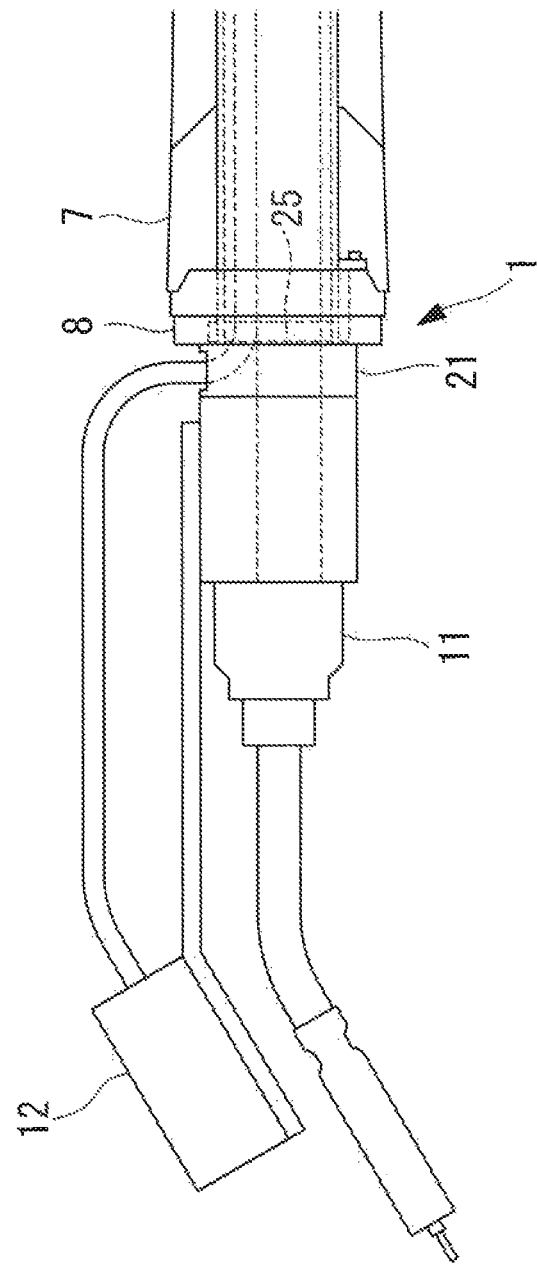
FIG. 3 illustrates a first modification of the wire body processing structure in FIG. 1 and is a cross-sectional view illustrating an example where the distal end of a conduit is fixed.
Figure 4:
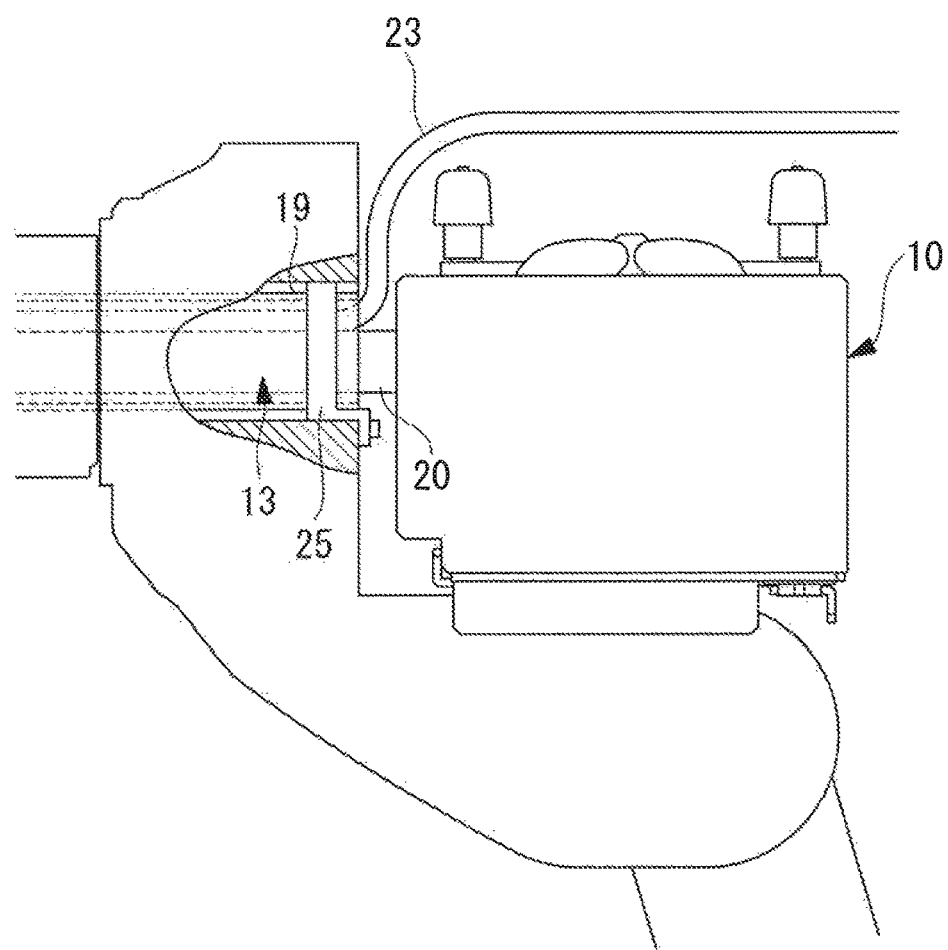
FIG. 4 illustrates a second modification of the wire body processing structure in FIG. 1 and is a cross-sectional view illustrating an example where the base end of the conduit is fixed.

Specifically, as shown in FIG. 3, the fixing member 25 may be fixed to the second wrist element 7 by means of, for example, a screw and may tighten around the outer surface of the first conduit 19 within the through-hole near the third wrist element 8. Alternatively, as shown in FIG. 4, the fixing member 25 may be fixed to the forearm 4 by means of, for example, a screw and may tighten around the outer surface of the first conduit 19 within the through-hole in the forearm 4.

The fixing member 25 may be inserted between the first conduit 19 and the second conduit 20 and may tighten around the outer surface of the second conduit 20, or may be fixed to the wire feed device 10 and may tighten around the outer surface of the second conduit 20 within the wire feed device 10.

Although the welding torch 11 and the sensor 12 are described as examples of working tools in this embodiment, the number of working tools is not limited to two.

As a result, the following aspect is read by the above described embodiment of the present invention.

An aspect of the present invention provides a wire body processing structure for a robot having a wrist a base end of which is connected to a forearm in a rotatable manner about a first axis and a distal end of which has a plurality of working tools attached thereto. The wire body processing structure includes a first conduit having flexibility and disposed along the first axis from the forearm to the distal end of the wrist and a second conduit having flexibility and disposed longitudinally within the first conduit. A first wire body for one of the working tools is disposed so as to extend longitudinally through the second conduit. A second wire body for another one of the working tools is disposed so as to extend longitudinally through a space between the first conduit and the second conduit. The first conduit and the second conduit may be tubular members composed of resin or may be tubular members formed of a fabric, such as aramid fiber. In particular, since the second conduit is disposed inside the first conduit, the second conduit may be a tubular member formed of a fabric.

According to this aspect, the first conduit and the second conduit, which have flexibility, form a double-tube structure and are disposed to extend along the first axis. Moreover, the first wire body for one of the working tools is routed through the second conduit at the inner side, and the second wire body for the other working tool is routed through the cylindrical space between the two conduits. Accordingly, the wire body for the plurality of working tools can be simultaneously disposed near the first axis, which is the rotational axis of the wrist relative to the forearm, and the paths of the wire body do not have to be significantly shifted even when the wrist is rotated about the first axis relative to the forearm, whereby interference between peripheral devices and the wire body can be reduced.

In the above aspect, the wire body processing structure may further include an attachment flange member configured to attach the plurality of working tools to the distal end of the wrist. The attachment flange member may be provided with a through-hole through which the second conduit extends and a window that exposes the space between the first conduit and the second conduit toward a radially outer side and through which the second wire body extends.

Accordingly, the second conduit at the inner side extends through the through-hole in the attachment flange member attached to the distal end of the wrist so as to reach the one working tool attached to the distal end of the wrist via the attachment flange member, whereby the first wire body extending through the second conduit can be readily routed to the one working tool. The second wire body extending through the space between the two conduits is routed radially outward of the attachment flange member via the window thereof immediately before the other working tool, whereby the second wire body can be readily routed to the other working tool attached to the distal end of the wrist via the attachment flange member.

In the above aspect, a distal end and a base end of the first conduit may be engaged with holes provided in the forearm and the wrist, and at least one of the distal end and the base end may be disposed in a movable manner along the first axis. For example, there may also be a case where the distal end of the wrist is fixed to the second wrist element at the distal end and the working-tool control device is disposed at the base end in a movable manner along the first axis.

Accordingly, even when the path length of the first conduit changes due to rotation or bending of the wrist, the change in the path length can be compensated for by moving the base end within the hole in the forearm or the distal end within the hole formed in the wrist along the first axis.

In the above aspect, a distal end of the first conduit may be engaged with a hole formed in the wrist in a movable manner along the first axis, and the wire body processing structure may further include a movement limiting unit that limits movement of the first conduit along the first axis so as to prevent the first conduit from protruding toward the attachment flange member beyond a distal-end surface of the wrist.

Accordingly, the movement limiting unit limits the movement of the first conduit engaged with the hole formed in the wrist in a movable manner along the first axis, whereby the second wire body extending via the space between the two conduits can be easily taken out through the window.

In the above aspect, a distal end and a base end of the second conduit may be engaged with holes provided in a member fixed to the forearm and the attachment flange member or in the working tools, and at least one of the distal end and the base end may be disposed in a movable manner along the first axis. For example, there may also be a case where the working-tool control device is fixed to the second wire body at the base end and the distal end of the wrist is disposed at the distal end in a movable manner along the first axis.

Accordingly, even when the path length of the second conduit changes due to rotation or bending of the wrist, the change in the path length can be compensated for by moving the base end within the hole in the member fixed to the forearm or the distal end within the hole in the working tool along the first axis.

In the above aspect, the distal end of the second conduit may be engaged with the hole provided in one of the working tools in a movable manner along the first axis, and the working tool may limit movement of the second conduit toward the distal end along the first axis.

Accordingly, by simply engaging the distal end of the second conduit with the hole provided in the working tool, the distal end of the second conduit is supported in a movable manner along the first axis and the movement thereof toward the distal end is limited, and the base end of the second conduit can be prevented from coming out of the hole in the member fixed to the forearm.

In the above aspect, the base end of the first conduit and the base end of the second conduit may be disposed in a movable manner along the first axis, the member fixed to the forearm may be a working-tool control device that is configured to control the working tools, and the working-tool control device may be configured to limit movement of the first conduit and the second conduit toward the base end along the first axis.

Accordingly, by simply engaging the base end of the second conduit with the hole provided in the working-tool control device, the base end of the second conduit is supported in a movable manner along the first axis, and the movement of the first conduit and the second conduit toward the base end is limited by the working-tool control device, whereby the distal end of the first conduit and the distal end of the second conduit can be prevented from coming out of the holes provided in the wrist or the working tools.

The invention claimed is:

1. A wire body processing structure for a robot having a wrist, a base end of which is connected to a forearm in a rotatable manner about a first axis and a distal end of which has a plurality of working tools attached thereto, the wire body processing structure comprising:
    a through-path extending therethrough along the first axis from the forearm to the distal end of the wrist;
    a first conduit accommodated within the through path and having flexibility and disposed along the first axis;
    a second conduit having flexibility and inserted inside the first conduit along longitudinal direction, and
    an attachment flange member configured to attach the plurality of working tools to the distal end of the wrist,
    wherein a first wire body for one of the working tools is disposed so as to extend longitudinally through the second conduit,
    wherein a second wire body for another one of the working tools is disposed so as to extend longitudinally through a space between the first conduit and the second conduit,
    a distal end of the first conduit is engaged with a hole formed in the wrist in a movable manner along the first axis, and
    wherein the wire body processing structure comprises a movement limiting unit that limits movement of the first conduit along the first axis so as to prevent the first conduit from protruding toward the attachment flange member beyond a distal-end surface of the wrist.

2. The wire body processing structure according to claim 1,
    wherein a distal and a base end of the second conduit are engaged with holes provided in a member fixed to the forearm and the attachment flange member or in the working tools, and at least one of the distal end and the base end is disposed in a movable manner along the first axis.

3. The wire body processing structure according to claim 2,
    wherein the distal end of the second conduit is engaged with the hole provided in one of the working tools in a movable manner along the first axis, and
    the working tool limits movement of the second conduit toward the distal end along the first axis.

4. The wire body processing structure according to claim 2,
    the base end of the first conduit and the base end of the second conduit are disposed in a movable manner along the first axis,
    wherein the member fixed to the forearm is a working-tool control device that is configured to control the working tools, and
    wherein the working-tool control device is configured to limit movement of the first conduit and the second conduit toward the base end along the first axis.

5. A wire body processing structure for a robot having a wrist, a base end of which is connected to a forearm in a rotatable manner about a first axis and a distal end of which has a plurality of working tools attached thereto, the wire body processing structure comprising:
    a first conduit having flexibility and disposed along the first axis from the forearm to the distal end of the wrist;
    a second conduit having flexibility and disposed longitudinally within the first conduit; and
    an attachment flange member configured to attach the plurality of working tools to the distal end of the wrist, wherein a first wire body for one of the working tools is disposed so as to extend longitudinally through the second conduit, wherein a second wire body for another one of the working tools is disposed so as to extend longitudinally through a space between the first conduit and the second conduit, wherein a distal end of the first conduit is engaged with a hole formed in the wrist in a movable manner along the first axis, and wherein the wire body processing structure comprises a movement limiting unit that limits movement of the first conduit along the first axis so as to prevent the first conduit from protruding toward the attachment flange member beyond a distal-end surface of the wrist, wherein the attachment flange member is provided with a through-hole through which the second conduit extends and a window that exposes the space between the first conduit and the second conduit toward a radially outer side and through which the second wire body extends.

6. The wire body processing structure according to claim 5, wherein a distal end and a base end of the first conduit are engaged with holes provided in the forearm and the wrist, and at least one of the distal end and the base end is disposed in a movable manner along the first axis.

\* \* \* \* \*